No. 885,450. PATENTED APR. 21, 1908.
E. W. DEMING.
APPARATUS FOR SEPARATING SOLIDS FROM LIQUIDS.
APPLICATION FILED DEC. 4, 1905.
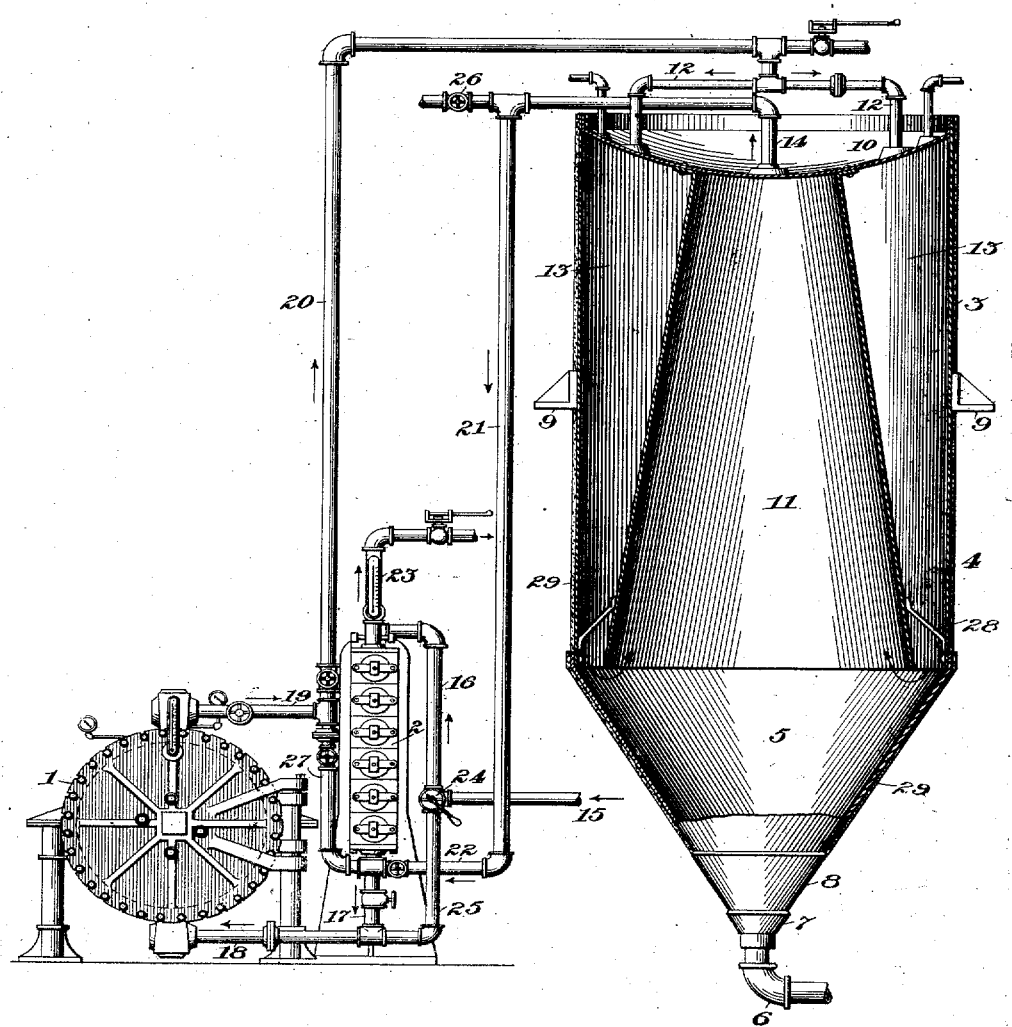

UNITED STATES PATENT OFFICE.

EUGENE W. DEMING, OF NEW YORK, N. Y.

APPARATUS FOR SEPARATING SOLIDS FROM LIQUIDS.

No. 885,450.

Specification of Letters Patent.

Patented April 21, 1908.

Application filed December 4, 1905. Serial No. 290,250.

*To all whom it may concern:*

Be it known that I, EUGENE W. DEMING, a citizen of the United States, residing at New York, in the county of New York and State of New York, have invented certain new and useful Improvements in Apparatus for Separating Solids from Liquids, of which the following is a specification.

In my prior patent Number 531,460, patented December 25, 1894, I have described and claimed a process of and apparatus for defecating saccharine solutions, the apparatus comprising essentially a digester or heater, an absorber or cooler, and an open settling tank designed to operate under continuous flow, suitable conduits being provided whereby the liquid to be treated is led through the several devices in succession. As therein described the cold liquid first enters the absorber, passing thence through the digester in which it is highly heated, preferably to a temperature exceeding its atmospheric boiling point; the superheated liquid from the digester then reënters the absorber and is cooled therein to a temperature not exceeding its atmospheric boiling point, the cooling being effected by transfer of heat to the cold liquid passing through the absorber on its way to the digester. The partially cooled liquid is then led to the continuous settling tank where the suspended impurities are separated.

My present invention is apparatus for the treatment of liquids carrying solids in suspension, and specifically for the treatment of saccharine solutions, the object of the invention being to separate the solids in a more economical and expeditious manner than has heretofore been possible, and in the case of saccharine and similar solutions to avoid the possibility of deterioration of the solutions by fermentation or otherwise.

The invention is based upon the observation that while the specific gravity of liquids and solutions is reduced at high temperatures, the specific gravity of suspended solids or coagulated impurities is substantially unaffected, from which it follows that such solids or impurities will separate with comparative rapidity and completeness from highly heated liquids. A further advantage in maintaining the liquid under pressure during the settling lies in the fact which I have observed that under these conditions the separation of gas bubbles, which under ordinary circumstances tend to cling to the solid particles and to maintain them in suspension, is largely avoided.

For a full understanding of my invention, reference is made to the accompanying drawings showing a digester and absorber of conventional form in elevation, and the improved settling tank in vertical section.

Referring to the drawings, 1 represents a digester which may conveniently be of the type shown in my prior patent Number 531,460 above referred to; 2 is an absorber of the general type therein described, its essential feature being the provision of two independent passages for liquid whereby a transfer of heat may be effected between two bodies or between two portions of the same body of liquid. The construction of these devices is well understood by those skilled in the art and they need not be further described herein.

3 represents a closed settling tank comprising in the particular form shown a cylindrical sheet-metal body 4 to which is secured a conical bottom 5 having an outlet 6 for the precipitate; the bottom is suitably reinforced as shown at 7, 8, and appropriate supporting lugs or brackets 9 are provided. The tank is provided with a liquid-tight cover 10, of sheet-metal, preferably inwardly arched to withstand high internal pressures of liquid.

11 is an interior pipe or partial partition which is secured to the cover 10 and may be entirely supported thereby as shown, or may be partially supported from the body of the tank, as by brackets 28. The purpose of this pipe or partition, hereinafter designated the "uptake", is to provide a tortuous passage for the liquid within the tank, the entering liquid carrying solid matter in suspension being introduced through pipes 12, 12 and flowing downwardly through the annular passage 13 between the uptake 11 and the cylindrical body 4 of the tank; the liquid flows around the base of the uptake 11, upwardly through the same, and escapes from the tank at 14, passing thence to the absorber as hereinafter described. The uptake is preferably of substantially conical form, the base being wider than the top as herein shown and as described in my prior patent Number 566,726, patented August 25, 1896, in order that the upward rate of movement of liquid in the lower portion of the tank may be relatively slow and the solids effectively separated.

When operating to separate the solid matters or impurities under high pressure and temperature, the course of the liquid through the apparatus is as indicated by the arrows upon the figure and is as follows: The liquid enters the system at 15 and passes by pipe 16 to the upper portion of the absorber 2, which it traverses, flowing thence by pipes 17 and 18 to the digester 1, wherein it is heated, preferably but not necessarily to a temperature exceeding its atmospheric boiling point. The heated liquid then passes directly by pipes 19, 20 to the inlets 12, 12 of the settling tank 3, the temperature and pressure of the liquid being substantially maintained during its passage through the tank and during the settling or precipitation of the solids or impurities. To assist in maintaining the temperature the tank may be covered with a heat-insulating coating 29. The hot liquid passes from the tank at 14 and is led by pipes 21, 22 to the lower portion of the absorber 2, rising through the absorber and transferring a portion of its heat to the cold liquid entering at 15, as heretofore described. The now partially cooled and clear liquid escapes from the absorber at 23 and is led to the evaporating system or otherwise disposed of as may be desired.

Suitable controlling and safety valves are provided in the piping system as will be understood without particular description. I prefer to so arrange the piping system that either the absorber or the settling tank may be temporarily or permanently disconnected for convenience in repairing or for other reasons which may render it desirable. Thus by means of the inlet valve 24 the inflowing liquid may be directed by pipe 25 to the digester 1 without passing through the absorber, and similarly the clear liquid flowing from the tank 3 may be conducted by pipe 26 directly to the evaporators without further cooling, the absorber being then entirely disconnected from the system. Or the settling tank may be disconnected by closing the valve in pipe 20 and opening the valve in pipe 27, in which case the heated liquid from the digester passes directly through the absorber. The precise manner in which the apparatus is used will depend to some extent upon the degree to which the liquid is heated in the digester 1; if the liquid is not highly heated therein the importance of the subsequent abstraction of heat in the absorber will be correspondingly lessened.

I do not limit myself to the particular means herein shown for separating the solids, but may substitute therefor any suitable inclosed separating device capable of operating under pressure; nor do I limit myself to any particular construction of the digester or heater, or of the absorber or cooler.

When treating saccharine or other solutions in which a flocculation due to the temperature occurs, it is found that in practice the impurities do not separate in flocculent form before the liquid reaches the tank 4. This is highly advantageous for the reason that such solutions show no tendency to clog or scale the pipes which they traverse on their way to the tank. The condition essential to flocculation is a reduction of the rate of flow of the liquid under circumstances affording sufficient time for flocculation to occur, and this condition is provided in the annular passage 13a. While the tank 4 is herein referred to as a "settling tank," it is to be understood that little or no settling of the solids in the usual meaning of this term occurs therein; the solids are in fact conveyed to a point near the bottom of the tank by the inflowing liquid, where, owing to their higher specific gravity, they remain until withdrawn. The construction of the tank and the relative position of its inlet and discharge openings, which are so situated that the hottest liquid is always in proximity to the outer walls of the tank, are such as to avoid the production of convection currents or any disturbances of the separated matter.

Obviously the apparatus may be operated intermittently in order to afford any desired period for the settling of the impurities in the tank 4.

I claim:—

1. In apparatus for separating solids from liquids, a heater, a separating device, adapted to operate under pressure, a heat-absorbing device and conduits arranged to convey the liquid from said heater to said separating device and thence to said heat-absorbing device.

2. In apparatus for separating solids from liquids, a heater, a settling tank adapted to operate under pressure, a heat-absorbing device, and conduits arranged to convey the liquid from said heater to said settling tank and thence to said heat-absorbing device.

3. In apparatus for separating solids from liquids, a heater, a settling tank adapted to operate under pressure and comprising a body portion, a liquid-tight cover, an inlet and outlet for liquid communicating with said tank near the upper portion thereof, and means for directing the liquid in a tortuous path between said inlet and outlet.

4. In apparatus for separating solids from liquids, a heater, a settling tank comprising a body portion, a liquid-tight cover, an inlet and outlet for liquid, and means for directing the liquid in a tortuous path between said inlet and outlet, a heat-absorbing device, and means for directing the liquid successively through said heater, settling tank and heat-absorbing device.

5. A settling tank comprising a body portion having a converging bottom and an outlet therefrom, a liquid-tight cover, a partial partition or uptake having a liquid-tight connection with said cover, and an inlet and outlet for liquid communicating with the interior of said tank on opposite sides of said uptake.

6. A settling tank comprising a body portion having a converging bottom and an outlet therefrom, an arched liquid-tight cover, a partial partition or uptake having a liquid-tight connection with said cover, and an inlet and outlet for liquid communicating with the interior of said tank on opposite sides of said uptake.

In testimony whereof, I affix my signature in presence of two witnesses.

EUGENE W. DEMING.

Witnesses:
H. ROBINSON,
H. GAILLARD.

---

DISCLAIMER.

885,450.—*Eugene W. Deming*, New York, N. Y. APPARATUS FOR SEPARATING SOLIDS FROM LIQUIDS. Patent dated April 21, 1908. Disclaimer filed January 21, 1914, by the *Deming Apparatus Company*, assignee.

Enters its disclaimer—

"To the following words, found on lines 33, 34, and 35 of page 1 of the specification, to wit: 'for the treatment of liquids carrying solids in suspension and.'"

*Official Gazette, January 27, 1914.* let for liquid communicating with the interior of said tank on opposite sides of said uptake.

6. A settling tank comprising a body portion having a converging bottom and an outlet therefrom, an arched liquid-tight cover, a partial partition or uptake having a liquid-tight connection with said cover, and an inlet and outlet for liquid communicating with the interior of said tank on opposite sides of said uptake.

In testimony whereof, I affix my signature in presence of two witnesses.

EUGENE W. DEMING.

Witnesses:
H. ROBINSON,
H. GAILLARD.

DISCLAIMER.

885,450.—*Eugene W. Deming*, New York, N. Y. APPARATUS FOR SEPARATING SOLIDS FROM LIQUIDS. Patent dated April 21, 1908. Disclaimer filed January 21, 1914, by the *Deming Apparatus Company*, assignee.

Enters its disclaimer—

"To the following words, found on lines 33, 34, and 35 of page 1 of the specification, to wit: 'for the treatment of liquids carrying solids in suspension and.'"

*Official Gazette, January 27, 1914.*

DISCLAIMER.

885,450.—*Eugene W. Deming*, New York, N. Y. APPARATUS FOR SEPARATING SOLIDS FROM LIQUIDS. Patent dated April 21, 1908. Disclaimer filed January 21, 1914, by the *Deming Apparatus Company*, assignee.

Enters its disclaimer—

"To the following words, found on lines 33, 34, and 35 of page 1 of the specification, to wit: 'for the treatment of liquids carrying solids in suspension and.'"

*Official Gazette, January 27, 1914.*